Patented Aug. 1, 1939

2,168,262

UNITED STATES PATENT OFFICE 2,168,262

EXTREME PRESSURE LUBRICANT

Edwin N. Klemgard and Vernon L. Ricketts, Martinez, Calif., assignors to Shell Development Company, San Francisco, Calif., a corporation of Delaware No Drawing. Application May 25, 1936,
Serial No. 81,683

12 Claims. (Cl. 87—9)

This invention is concerned with high pressure lubricants, and is particularly concerned with the manufacture of lubricants which permit relatively moving metallic surfaces to be loaded to a greater pressure per unit area before seizing and scoring of the bearing surface takes place than such pressures are possible when a lubricant suitable for milder conditions, e. g., a pure mineral oil, is employed.

In modern lubrication, account has to be taken of very high pressures occurring temporarily between the adjoining parts of moving metallic surfaces. Such pressures, particularly when accompanied by high speeds, give rise to high temperatures under which ordinary lubricants are no longer able to keep the moving surfaces apart. Such conditions develop, for example, in steel-mill rolling necks, universal joints and especially in the use of worm and hypoid gears in automobile transmissions and differentials, but may also develop in crank shaft bearings in an internal combustion engine. It is known that in such cases ordinary lubricating films fail to keep the moving surfaces apart and therefore fail to protect the metal against contact and scoring. To remedy this, it has heretofore been proposed to separate the metallic surfaces by providing a thin layer, of the order of molecular dimensions, of chemical compounds formed on and from the metal of the relatively moving parts. It is believed that some of the substances, such, for example, as sulfur, chlorine, etc., when added to lubricating oils and subjected to high temperatures produced by the pressure on the moving parts, combine in some chemical manner with the metal of these parts, producing microscopic protective films which adhere tenaceously to metal surfaces. This prevents metal-to-metal contact when the oil film breaks under extremely high pressures and its function of lubricating metal surfaces is performed by the dense protective film form on the metal surface.

It is an object of the present invention to provide a lubricant which will adhere to metal surfaces and prevent metal-to-metal contact at high pressures, in the absence of a true film of oil.

The lubricating composition of the present invention is particularly adapted for lubricating metallic parts which are operated under high pressures. They may, however, also be employed in situations in which lower pressures are employed. Thus, in ordinary film lubrication, well lubricated bearing loads rarely exceed 2,000 lbs. per sq. in. projected area, and the rubbing speeds are generally sufficient to maintain a film of oil which separates the rubbing surfaces, so that ordinary lubricants, suitable for mild conditions, are satisfactory. But when a machine of this type is out of operation the oil often drains out from the space between the relatively movable parts, thereby destroying the film, and trouble is often encountered when the machine is first started up. The lubricating composition of the present invention will prevent damage to the metallic parts during such starting up period, because the microscopic film is tenaceously held to the metal, and will not flow out when the machine is out of operation.

One of the essential requirements to be satisfied by the protective films which are chemically attached to the metal of the bearing surface is that their internal cohesion and, contingently, their external adhesion, be less than that of the metal underneath said films, so that when the whole or part of the protective film is swept away by small irregularities in the metal, or by friction, the metal of the surface is not abraded.

We have discovered that organic esters of sulphonic acids, when admixed to lubricants suitable for milder conditions, particularly hydrocarbon oils, are of especial utility in the field of extreme pressure lubrication. The esters may, in general, be represented by the formula: $R_m.(SO_2.O)_n.R'_p$ where R and R' represent open or closed organic chains, and may or may not be substituted, $n$ is any integer not greater than $m$ times the number of sulfonatable carbon atoms in R, and $m$ and $p$ are integers equal to or less than $n$. It should be noted that when $m$ or $p$ is greater than 1, each of the radicals R or R' may be different.

The acid and the ester radicals R and R', respectively, of our esters may be derived from either aliphatic or cyclic structures, such as normal and branched chain paraffins and olefines, benzene, naphthalene, anthracene, diphenyl, and the like, which may contain other polar groups, particularly —OH, —NH₂, and/or halogen, such as —Cl. The length of the carbon chain in the ester group depends upon the number of sulfonic acid groups in the acid and upon the molecular size of the acid, and is selected to produce a compound which is substantially non-volatile, and which may be combined with the lubricant without greatly changing its viscosity. These aliphatic chains in the ester group R' preferably have more than five carbon atoms, and may have as many as thirty or even more, although lower groups, e. g., ethyl or butyl groups may be employed. A wide variety of sulphonic acids may be employed. Thus, aliphatic or aromatic, or mixed aliphatic-aromatic esters of ethyl, butyl, lauryl, stearyl, benzene, naphthalene, diphenyl, anthracine, benzyl, aniline, benzidine, hydrazine, and ethyl-benzyl mono- or poly-sulphonic acids may be employed. The corresponding halogenated, and hydroxy esters may also be employed. Specific examples of esters are: hexyl ester of dodecyl sulphonic acid, isodecyl ester of 1-naphthol-7-sulphonic acid, chlorbenzyl ester of naphthalene mono- and di-sulphonic acids, benzyl ester of octadecyl sulphonic acid, etc.

While we have indicated certain specific compounds, it should be noted that we contemplate the use of derivatives of petroleum fractions, and that for this reason the esters actually to be employed will often be of unknown composition, and be a mixture of esters of different radicals, and containing both mono- and di-esters. In the case of poly-sulphonic acids, the esters are preferably neutral, although acid esters may in certain cases be employed, particularly under anhydrous conditions.

The esters may be prepared by any known method, such as the esterification of sulphonic acids prepared by treating a hydrocarbon, or a petroleum fraction, with concentrated or fuming sulfuric acid, or by oxidation of the corresponding mercaptan, disulphide, or thiocyanate.

These esters may be added to other lubricants, such as petroleum mineral oils, in relatively small amounts, ranging from a few tenths of one per cent to five or even as high as 20 per cent. They are suitable with a great variety of metals, such as ferrous alloys, bronze or copper alloys, cadmium-siver alloys, etc.

To further illustrate the preparation and use of these substances, the following example is presented:

One volume of benzene and three volumes of fuming sulphuric acid (20% oleum) are brought together at a temperature of 25° C. After the first evidence of reaction have subsided, the reaction mixture is warmed gently for a few minutes. The principal products of the reaction are benzene mono- or di-sulphonic acids, of the following formulae:

$$C_6H_5.SO_2OH \text{ and } C_6H_4.(SO_2.OH)_2.$$

The reaction mixture is poured into several times its volume of water and an excess of lime is added. The precipitated $CaSO_4$ is removed by filtration through cloth using pressure to remove the solution retained by the precipitate. The calcium salts of the sulphonic acids are water soluble and are present in the filtrate.

The sulphonic acids are then recovered by adding an excess of strong hydrochloric acid and evaporating the solution almost to dryness. The crystals are filtrated from the small volume of liquid remaining, and dried. The sulphonic acids so prepared are treated with an excess of $PCl_3$, the excess $PCl_3$ being removed by distillation. The sulphonyl chlorides are formed in accordance with the following probable equation:

$$3C_6H_5SO_2OH + PCl_3 \rightarrow C_6H_5SO_2Cl + H_3PO_3$$

A similar reaction takes place with the di-sulphonic acid.

Iso-amyl alcohol is added to the reaction mixture in small amounts. The reaction is complete when a small addition of iso-amyl alcohol causes no further evolution of hydrogen chloride gas.

The reactions occurring here may be represented as follows:

$$C_6H_5SO_2Cl + C_5H_{11}OH \rightarrow C_6H_5SO_2.O.C_5H_{11} + HCl$$

$$C_6H_4(SO_2Cl)_2 + 2C_5H_{11}OH \rightarrow$$
$$C_6H_4(SO_2.O.C_5H_{11})_2 + 2HCl$$

The sulphonic esters so prepared may be washed with water to free them from phosphorous acid, and the washed product distilled, collecting the fraction boiling above 140° C. The distillation cannot be carried out directly because of the decomposition of the phosphorous acid by heat, with the formation of phosphine and phosphoric acid, the former being spontaneously inflammable.

A Mid-Continent steam refined lubricating oil having a viscosity 180 sec. Say. Univ. at 210° F. was tested in a Timken lubricant tester, first alone, and then together with 5% of the fraction boiling between 140° and 190° C., obtained in the manner described above, with the following results:

| Lubricant | Timken test in lbs./sq. in. | |
|---|---|---|
| | Satisfactory | Failed |
| 100% Mid-Continent oil | 5,715 | 8,575 |
| 5% (by volume) iso-amyl esters of benzene mono- and di-sulphonic acids 95% Mid-Continent oil | 34,280 | 37,140 |

The use of these esters in lubricants makes it possible to employ lubricants which have considerably lower viscosities than was heretofore considered safe for ordinary film lubrication. Thus, oils having viscosities as low as 80 or 100 sec. Say. Univ. may be employed under high bearing loads, since the effect of our lubricant depends upon the formation of a microscopic film which is attached to the metal by a chemical bond, and is not dependent upon the existence of a true film of oil.

It should be noted that this invention is in no way limited to the examples given, and consists broadly in the use of organic esters of compounds containing the group $-SO_2.OH$ in combination with lubricating mineral, animal or vegetable oils or lubricating greases, such as greases having soda, lime, lead, or aluminum bases.

Without departing from the spirit of this invention, other ingredients may also be added to increase the tenacity of the resulting lubricant and prevent leakage from bearings or gear cases. For instance, a mineral lubricating oil containing the above esters could also contain aluminum stearate, soda soaps, lead soaps, and/or row or vulcanized rubber.

We claim as our invention:

1. A lubricating composition comprising a lubricant and an organic ester of a sulphonic acid the quantity of ester being insufficient to substantially change the viscosity of the lubricant.

2. A lubricating composition comprising a major quantity of an oleaginous lubricant and a minor quantity of an ester of a sulphonic acid the quantity of ester being insufficient to substantially change the viscosity of the lubricant.

3. An extreme pressure lubricant comprising a lubricant suitable for milder conditions and a quantity of an organic ester of a sulphonic acid effective for high pressure lubrication the quantity of ester being insufficient to substantially change the viscosity of the lubricant.

4. An extreme pressure lubricant comprising a lubricant suitable for milder conditions and a quantity of an organic ester of a sulphonic acid effective for high pressure lubrication in which the ester radicals are of the group consisting of alkyl radicals, aryl radicals, and halogen and hydroxy substitution and products thereof the quantity of ester being insufficient to substantially change the viscosity of the lubricant.

5. An extreme pressure lubricant comprising at least 80% of a lubricant suitable for milder conditions and an organic ester of a sulphonic acid effective for high pressure lubrication.

6. An extreme pressure lubricant comprising a lubricant suitable for milder conditions and between 0.1% and 20% of an organic ester of a sulphonic acid.

7. A composition of matter which includes a lubricating composition having as a primary lubricating constituent the combination of a suitable oil base and an ester of a sulphonic acid the quantity of ester being insufficient to substantially change the viscosity of the lubricant.

8. A composition of matter which includes a lubricating composition having as a primary lubricating constituent the combination of a suitable oil base and an alkyl ester of a sulphonic acid.

9. A composition of matter which includes a lubricating composition having as a primary lubricating constituent the combination of a suitable oil base and an aryl ester of a sulphonic acid.

10. A composition of matter which includes a lubricating composition having as a primary lubricating constituent the combination of a suitable oil base and a mixed alkyl and aryl ester of a polysulphonic acid.

11. A composition of matter which includes a lubricating composition having as a primary lubricating constituent the combination of a suitable oil base and a halogen bearing ester of a sulphonic acid.

12. A composition of matter which includes a lubricating composition having as a primary lubricating constituent the combination of a suitable oil base and an aliphatic ester of an aromatic sulfonic acid.

EDWIN N. KLEMGARD.
VERNON L. RICKETTS.